US007074477B2

(12) United States Patent
Ast

(10) Patent No.: US 7,074,477 B2
(45) Date of Patent: Jul. 11, 2006

(54) TRANSFER LABEL

(75) Inventor: Hans-Peter Ast, Brannenburg (DE)

(73) Assignee: Zweckform Etikettiertechnik GmbH, Holzkirchen (DE)

( * ) Notice: Subject to any disclaimer, the term of this patent is extended or adjusted under 35 U.S.C. 154(b) by 672 days.

(21) Appl. No.: 09/906,051

(22) Filed: Jul. 17, 2001

(65) Prior Publication Data

US 2002/0015828 A1 Feb. 7, 2002

Related U.S. Application Data

(63) Continuation of application No. 09/125,049, filed on Aug. 12, 1998, now abandoned.

(30) Foreign Application Priority Data

Feb. 12, 1996 (DE) ........................................ 296 02 430

(51) Int. Cl.
*B32B 27/14* (2006.01)
*B32B 3/00* (2006.01)

(52) U.S. Cl. ....................... 428/195; 428/212; 428/343; 428/913; 428/914

(58) Field of Classification Search ................ 428/195, 428/212, 343, 345, 352, 353, 355 R, 9 B, 428/914
See application file for complete search history.

(56) References Cited

U.S. PATENT DOCUMENTS

| | | | | |
|---|---|---|---|---|
| 3,287,192 | A | 11/1966 | Pohlenz | 156/3 |
| 3,516,842 | A | 6/1970 | Klinker et al. | 117/3.4 |
| 3,847,725 | A | 11/1974 | Hochner | 161/167 |
| 3,922,435 | A | 11/1975 | Asnes | 428/349 |
| 4,012,552 | A | 3/1977 | Watts | 503/227 |
| 4,308,310 | A | 12/1981 | Arnold et al. | 428/195 |
| 4,421,816 | A | 12/1983 | Arnold | 428/202 |
| 4,454,179 | A | 6/1984 | Bennett et al. | 428/41 |
| 4,529,624 | A | 7/1985 | Hubbard | 427/148 |
| 4,704,310 | A | 11/1987 | Tighe et al. | 427/261 |
| 4,780,348 | A | 10/1988 | Yamamato et al. | 428/43 |
| 5,104,719 | A | 4/1992 | Kamen et al. | 428/195 |
| 5,403,811 | A | 4/1995 | Mikoshiba et al. | 503/227 |
| 5,448,282 | A | 9/1995 | Imai et al. | 347/213 |
| 5,494,885 | A | 2/1996 | Kudo et al. | 503/227 |
| 5,560,796 | A | 10/1996 | Yoshimura | 156/240 |
| 5,919,834 | A | 7/1999 | Downs et al. | 522/33 |

FOREIGN PATENT DOCUMENTS

| | | |
|---|---|---|
| DE | 369 323 | 7/1979 |
| DE | 40 09 672 | 10/1990 |
| DE | 41 19 416 | 12/1992 |
| EP | 0 461 796 | 12/1991 |
| EP | 0 479 223 | 4/1992 |
| EP | 0 489 960 | 6/1992 |
| GB | 1 320 842 | 6/1973 |
| JP | 2-88285 | 3/1990 |

OTHER PUBLICATIONS

Patent Abstracts of Japan, M–1623, Jun 17, 1994, vol. 18/No. 319.

Patent Abstracts of Japan, M–987, Jun. 20, 1990, vol. 14/No. 285.

International Application No. WO 90/05088, published May 17, 1990.

International Application No. WO 95/06564, published Mar. 9,1995.

*Primary Examiner*—Bruce H. Hess
*Assistant Examiner*—B. Shewareged
(74) *Attorney, Agent, or Firm*—Rothwell Figg Ernst & Manbeck

(57) ABSTRACT

A transfer label comprises a support layer (1), further an overprint layer (5) detachably affixed by adhesive to the support layer (1) and affixable to an object, and a protective film (3) mounted between the support layer (1) and the overprint layer (5) and detachable from the support layer (1). The protective film is substantially non-plasticizing and directly adheres to the support layer (1) but is detachable from the label substantially independently of label temperature and is a thoroughly polymerized material.

13 Claims, 1 Drawing Sheet

TRANSFER LABEL

This is a Continuation of application Ser. No. 09/125,049 filed Aug. 12, 1998, which is the national stage of PCT/EP 97/00642, filed Feb. 12, 1997 designating U.S., which claims the benefit from German application No. 29602430.9, filed Feb. 12, 1996. The disclosure application No. 09/125,049 is hereby incorporated by reference in its entirety.

FIELD OF THE INVENTION

The invention relates to a transfer label comprising a support layer, an overprint layer detachably present on the support layer and adhesively affixable to an object and a protective film sandwiched between the support layer and the overprint layer and detachable from the support layer.

BACKGROUND OF THE INVENTION

A label of this species is known from the patent document WO90/05088. This document discloses a release layer between a high-gloss coated support layer and the layers to be transferred to the substrate, said release layer being thermally activated when the label is transferred to the object to allow detaching the layers being transferred from the support layer. In the absence of such a release layer, the support layer cannot be removed from the heated label. Following label transfer to the object, an additional protective film is deposited and then cured under uv irradiation. This post-curing stage requires a comparatively long path and substantial equipment. This is especially so when the said objects are glass beverage bottles which are clad in plastic layers to reduce friction under the crowded operations in bottling plants, said plastic layers requiring care during uv irradiation.

The U.S. Pat. No. 4,529,624 describes a transfer label of which the outer layer is connected with the support layer by a paraffin layer that shall melt during transfer. Following transfer the paraffin remains on the label, and residues may remain on the support layer. Accordingly transfer is not always complete.

The paraffin layer is smoothed by subsequent exposure to flame and as a result becomes more transparent and glossy, and less obvious.

Accordingly, it is the objective of the invention to create a transfer label which can be transferred in residue-free manner to an object and which does not require after-treatment.

SUMMARY OF THE INVENTION

This problem is solved by means of a transfer label of the above kind wherein the protective film is thoroughly polymerized and essentially non-plasticizable and directly adheres to the support layer but substantially is detachable from it independently of label temperature.

This design eliminates a thermally detachable connecting layer between the protective film and the support layer and thereby no residues of release or wax layers can remain on the label following its transfer to the object. Because the scratch-resistant protective film already is part of the label, no additional protective film need be deposited on the label adhering to the object. The label can be manufactured in one pass and in-line manner. The detachment of the support layer shortly before or during or shortly after bonding the label on the object is independent of label temperature. If the adhesive is a thermally activated one and if the label while being heated is deposited on a correspondingly heated object, the support layer can be immediately removed. The same advantage is also achieved with a cold-transferable label.

Because the release layer is absent, the overprinting of the ink layers will be especially accurate. The interface between the support layer and the protective film is especially sharply defined and thereby the label can be detached in well controlled manner from the support layer and be applied smoothly. The interaction of the adjoining surfaces of the protective film and support layer is based on adhesion forces, for instance electrostatic ones. After the label has been separated from the support layer and transferred to the object, the exposed surface of the protective film remains non-adhesive regardless of temperature. The protective film is hard and scratch resistant.

Preferably the support layer and the protective film are matched materials with temperature-independent bonding to each other. The support layer may consist of several plies. Preferably the support layer consists of polypropylene at least on the side facing the protective film, and the side of this polypropylene bearing the protective film shall be preferably untreated. The thickness of the support layer may be 20 to 100μ, preferably 35 to 60μ. To allow easily unwinding the compound of support layer and transfer label off a roll, the side of the support layer away from the protective film may be non-adhesive, for instance being siliconized or fitted with a releasing vanish.

Preferably the protective film is made of irradiation-curing varnish, in particular of a cationically cold-crosslinked uv hardening varnish. Cold crosslinked cationic uv varnish cures cold under uv irradiation. The chain reaction starts by uv impact. Crosslinking and curing also are fully completed without further uv application. Following curing, the protective film remains non-sticky.

Alternatively a chemically radical uv varnish may be used which cures as long as uv irradiation is applied to it. However if irradiation is less than complete, the varnish sometimes will remain sticky and thereby the next layer in the label compound will not properly adhere and so-called skinning takes place.

The protective film is thinner than the support layer, preferably by a factor of 2 to 100, preferably 10 to 20. Preferably the protective film is 1 to 10μ, especially preferred 2.5 to 5μ. The thinner the protective film, the less the heat needed for label transfer and the less the thermal stress on the object. This consideration is particularly significant when the object is a beverage bottle coated with a slippery plastic.

The protective film may be stretchable to absorb squeeze and tensile stresses during label transfer to the object, and its tear elongation may be in the range of about 50 to 400%, preferably 100 to 300%, preferably 150 to 250%, preferably about 200%.

An appropriate protective film may be made of polyethylene or polypropylene which adheres in non-sticky manner to the support layer. The protective film may be co-extruded with the support layer. The overprint layers may consist of solvent varnishes. Preferably they are water-insoluble, heat-resistant, ink fast, shade fast, opaque and heat resistant.

Depending on the materials of the overprint layers and of the protective film, the overprint layers may only poorly adhere to the protective film, for instance when solvent-containing layers must be overprinted on a cationically uv cured protective film. In such cases preferably a primer layer is overprinted on the protective film before printing the overprint layers. The primer layer acts as an adhesion-inducing means. The primer layer may be single-ply and in addition to its adhesion-inducing properties may also act as a barrier against the migration of solvents from the overprint layer into the protective film. The primer layer may comprise an adhesion film on the side of the protective film and thereon an additional barrier film, or, starting from the protective film, it may comprise an adhesion film, a barrier film and a further adhesion film on which the overprint layers then can be printed.

The stretchability of the overprint layer and any primer layer, of the barrier layer as well as of the adhesion film(s) can be matched to that of the protective film and the stretchability of the individual layers/films may decrease from the adhesive side toward the side of the protective film. This design allows damage-free label transfer to the object while at the same time offering high protective film effectiveness.

The adhesive layer may consist of a pressure-sensitive adhesive, a thermoactivated adhesive which shall be permanently bonding following a single heat application or of a thermo-responsive adhesive which shall be adhering only during heating.

A thermoactivated adhesive may be a binary adhesive of which one component or one reagent is present in the form of microcapsules that shall burst when heated, whereupon the components shall mix and curing shall be initiated. The use of such binary adhesives when bonding labels to objects is independent of label configuration.

When the label is bonded on the object and a thermoactivated adhesive is used, the object should be preheated as closely as possible to that temperature to which the adhesive must be raised when affixing takes place. This temperature should be in a range wherein no damage occurs to the friction-reducing plastic coating of a bottle to be labeled.

The label is made by overprinting the particular layers/films consecutively on the support layer, the protective film and the print, i.e. ink layers and any primer being overprinted substantially contour-congruently on the support layer. To protect the edges of the ink layers the protective film may be made to overlap them. The adhesive layer also is overprinted in contour-congruent manner relative to the ink layers and the protective film.

A preferred embodiment comprises the following stages:

(1) preparing a support layer, (2) contour-congruent overprinting a protective film constituted of a material to be crosslinked directly on the support layer, (3) polymerizing the protective film into a substantially non-plasticizing protective film which detachably bonds by adhesion to the support layer regardless of label temperature, (4) contoured overprinting of at least one overprint layer on the protective film, and (5) contoured overprinting of the adhesive on the overprint layer.

After the label has been overprinted on the object, this object appears as having been printed rather than having been fitted with a two-dimensional label.

Preferred embodiments of the invention are elucidated below in relation to the drawings

DETAILED DESCRIPTION OF DRAWINGS

Figure 1:
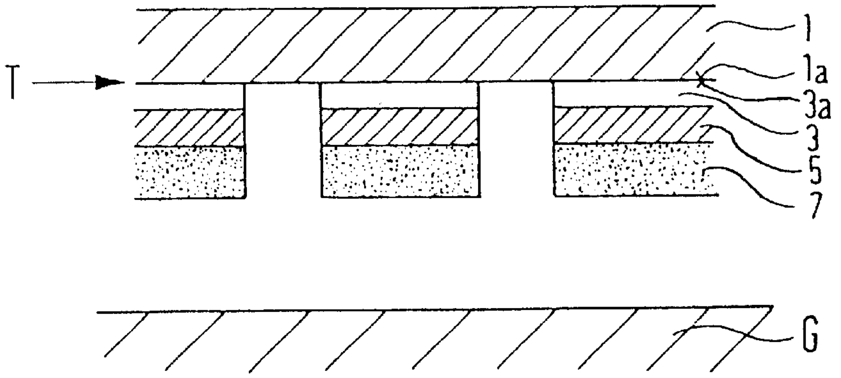
FIG. 1 is a schematic cross-section of a first embodiment of a transfer label.

FIG. 1 shows a support layer 1 which may consist of several plies of coextruded polypropylene or polyethylene on a paper base and which may be 20 to 100μ thick and comprises a polypropylene surface with little surface energy and of low adhesion. Several thermoplastics are extruded jointly in co-extrusion. Sheets of several plies are formed, which offer the advantage over singly-ply sheets that the particular plies may assume different functions (for instance a smooth outer ply for good overprinting or inner plies with adhesive surfaces for low blocking effect.

The polypropylene or polyethylene is not pretreated, and therefore its surface energy, or its surface tension is low, latter for instance being 28–32 mN/m. A preferably prepolymerized protective film is overprinted in contoured manner on said low-adhesion surface 1*a*. Thereupon the protective layer is throughly polymerized into a protective film which is no longer plasticizable on account of its dissolved cohesion. The directly superposed surfaces 1*a* and 3*a* of the support layer 1 and of the protective film stick to each other by physical adhesion, for instance by electrostatic forces. The adhesion bonds the protective film 3 only weakly to the support layer 1, that is, it does not bond comparatively firmly as do pressure-sensitive adhesives.

This adhesion is temperature-independent. Preferably the protective film 3 consists of a cationically cold crosslinking varnish curing under uv irradiation which starts a chain reaction by uv impact and cures completely and following curing remain non-sticky.

The thickness of the protective film is 1 to 10μ, preferably 2.5 to 5μ. Preferably the protective film is elastic to absorb tensile, squeeze forces and warping during the transfer to the object, illustratively with a stretchability in the range of about 50 to 400%, about 100 to 300%, especially about 150 to 250, preferably about 200%, per DIN. 53455 (tear elongation of the protective-film material). Preferably the uv curing protective film contains in its basic form acrylic-acid polymers, about 40% by wt polyurethane acrylate polymer mixture, about 20% by wt monofunctional octyl-decyl-acrylate and about 35% by wt tripropylene glycol diacrylate (TPGDA) and additives as remainder.

Alternatively a chemically radical uv-curing varnish may be used of which cures as long as there is uv irradiation. This varnish as well may offer the above stretchability. Appropriate varnishes furthermore are those curing under electron irradiation as well as polyethylene or polypropylene plies adhering to the support layer in the above discussed interaction. The following material pairings for support layer and protective film are applicable:

EVA\PE=ehtylenevinylacetate/polyethylene

EVA/PP=ethylene vinylacetate/polypropylene

WPVC/PE=soft-polyvinylchloride/polyethylene

WPVC/PP=soft-polyvinylchloride/polypropylene.

An ink layer 5 consisting preferably of a solvent-containing varnish is overprinted on the protective film 3 while substantially congruent with its contour. This varnish as well as the protective film is heat-resistant. Moreover the ink layer is water-insoluble, heat resistant, ink fast, hue fast and opaque.

Depending on the application, a cold-bonding or a thermally activated adhesive layer 7 is overprinted congruently in contour with the ink layer 5 and the protective film 3 of the ink layer 5. The thickness of the adhesive layer 7 is 2 to 40μ. Preferably the stretchability of the ink layer 5 matches that of the protective film and especially is larger than that of the protective film.

Preferably when transferring the label from the support layer 1 to the surface of an object G, this object G will be preheated to the temperature of the adhesive layer 7. Thereupon the support layer with the label sticking to it is pressed by a heating plate or heating drum on the object and thereby the adhesive layer 7 becomes sticky and together with it the contour-congruent ink layer 5 and protective film 3 remain glued to the object. Next the support layer is detached in the release plane denoted by T in FIG. 1 from the protective film 3 and removed. For instance using a transfer drum, the removal of the support layer also can take place shortly before the label is bonded to the object, or, in case the label should have to be agglomerated onto the object, also after bonding. The stretchability of the material of the support layer is substantially less than that of the label layers/films 3, 5 and 7, preferably being 50 to 150%.

The surface 3*a* of the protective film 3 that before transfer touched the support layer 1 now forms the outer surface of the label, the uv cured protective film 3 protecting the label against scratching. Because of the adhesive connection, neither the protective film 3 nor the support layer 1 are sticky after said layer has been released.

The contours of the protective films may slightly overlap those of the ink and adhesive layers in order that when the label has been transferred, the protective film also covers and protects the contour edges of the ink and adhesive layers.

Figure 2:
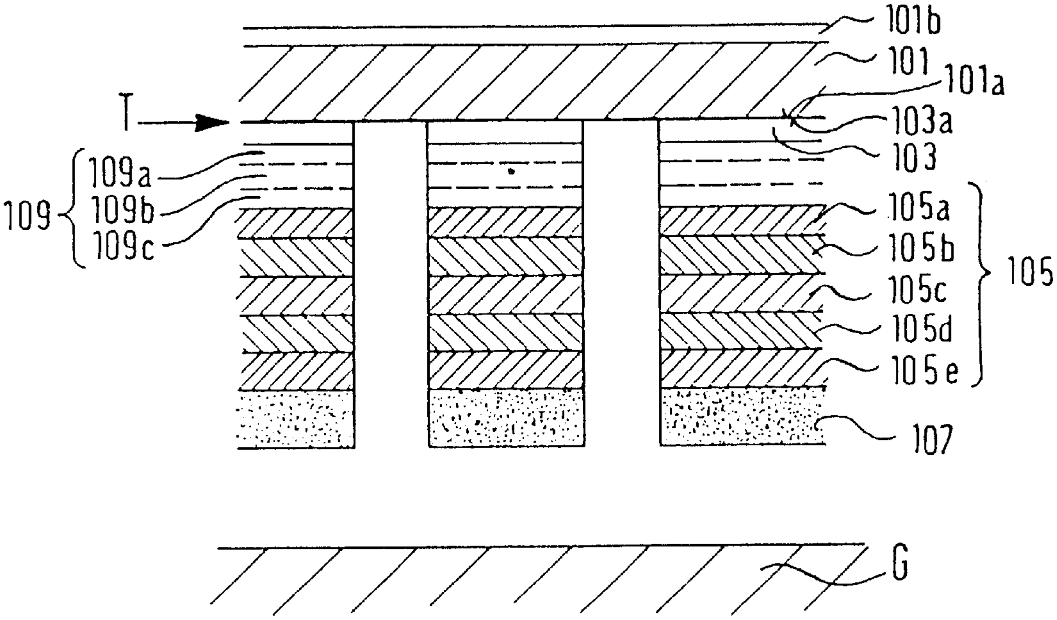
FIG. 2 is a schematic cross-section of a second embodiment of a transfer label.

FIG. 2 shows another embodiment of a transfer label. Layers and films corresponding to the above discussed ones are denoted by the same references increased by 100. A protective film 103 made of cationically cold curing uv varnish is overprinted on the support layer and its interfacing surfaces 101*a* and 103*a* respectively adhere to each other in temperature-independent manner.

A primer layer 109 is overprinted on the protective film 103 and simultaneously can form a barrier against solvents that may issue from ink layers to be overprinted on the protective film. Depending on the matching of the materials of protective film and ink layers, the primer layer may comprise several plies, illustratively an adhesion-inducing film 109*a* on the protective film 103, a barrier film 109*b* against migrating solvents and again an adhesion-inducing layer 109*c* for the ink layers 105 overprinted thereon. The shown embodiment comprises five ink layers 105*a* through 105*e*. Obviously any other number of ink layers also is conceivable. As above, the ink layers are solvent-containing varnishes, being heat resistant, water-insoluble, ink fast, shade fast and opaque.

The stretchability of the primary layer(s) 109*a–c* and the ink layer(s) 105*a–e* always can be matched to that of the protective film 103 and of the ink layer(s) 105*a–e*.

A thermoactivated adhesive layer 107, which may be designed in the manner of the first embodiment, is overprinted in contour-congruent manner with the protective film 103, primer layer 109 and at least one ink layer 105 onto the last ink layer 105*e*.

On its side away from the protective film 103, the support layer 101 comprises a non-sticky film of silicone or release varnish preventing that, when the support layer 101 is in a wound form, a plurality of bonded labels on it shall bond with the adhesive layer 107 of the next lamina of labels of the roll of the support layer 101. The stretchability of the support layer material 101 is substantially less than that of the label layers 103, 105, 109 and amounts to about 50 to 150%.

The transfer of the label from the support layer 101 to the object G is carried out in the same manner as described above, and following transfer, the support layer 101 separates along the release plane T between the two surfaces 101*a* of the support layer 101 and the surface 103*a* of the protective film without residues being left behind.

What is claimed is:

1. A transfer label comprising:

a support layer, an overprint layer disposed in a detachable manner to the support layer and affixable to an object by means of an adhesive, and a protective layer disposed between the support layer and the overprint layers, wherein said protective layer is detachably disposed on the support layer, directly adheres to the support layer via physical adhesion, is substantially detachable from the support layer independent of the label's temperature, has the property of forming a protective film, is thoroughly polymerized and essentially non-plasticizable, is an UV cured varnish, and wherein said support layer, at least on the side facing the protective layer is made of unpretreated polypropylene or unpretreated polyethylene.

2. The transfer label of claim 1, wherein the protective film is formed from a UV varnish cationically cold-crosslinking under irradiation.

3. The transfer label of claim 2, wherein the overprint layer is formed from a solvent-containing varnish.

4. The transfer label of claim 1, wherein at least one overprint layer adheres to the protective film by means of a prime layer and wherein the primer layer has at least one adhesion-inducing partial layer and a barrier layer preventing migration of solvents into the protective film.

5. The transfer label of claim 1, wherein the protective film is stretchable.

6. The transfer label of claim 5, wherein the protective film has a stretchability in the range of 50–400%.

7. The transfer label of claim 5, wherein the protective film has a stretchability in the range of 100–300%.

8. The transfer label of claim 5, wherein the protective film has a stretchability in the range of 150–250%.

9. The transfer label of claim 5, wherein the protective film has a stretchability in the range of 200%.

10. The transfer label of claim 1, wherein the protective film has a base composition containing acrylic acid based polymers.

11. The transfer label of claim 10, wherein the protective film has a composition of approximately 40% polyurethane-acrylate polymer mixture, 20% monofunctional octyl-decyl acrylate and 35% tripropylene glycol diacetate and a rest of additives.

12. The transfer label of claim 1, wherein the respective stretchabilities of the label layers to be transferred decrease from the side of the adhesion to the side of the protective layer.

13. The transfer label of claim 1, wherein the stretchability of the support layer is less than the stretchability of the label layers to be transferred.

* * * * *